US007746351B2

(12) United States Patent
Karlov

(10) Patent No.: US 7,746,351 B2
(45) Date of Patent: *Jun. 29, 2010

(54) SYSTEMS AND METHODS FOR UPDATING A FRAME BUFFER BASED ON ARBITRARY GRAPHICS CALLS

(75) Inventor: Donald David Karlov, North Bend, WA (US)

(73) Assignee: Microsoft Corporation, Redmond, WA (US)

( * ) Notice: Subject to any disclaimer, the term of this patent is extended or adjusted under 35 U.S.C. 154(b) by 655 days.

This patent is subject to a terminal disclaimer.

(21) Appl. No.: 11/507,704

(22) Filed: Aug. 22, 2006

(65) Prior Publication Data

US 2006/0279578 A1 Dec. 14, 2006

Related U.S. Application Data

(63) Continuation of application No. 10/622,749, filed on Jul. 18, 2003, now Pat. No. 7,145,566.

(51) Int. Cl.
*G09G 5/36* (2006.01)
*G06T 1/60* (2006.01)

(52) U.S. Cl. ........................ 345/545; 345/556; 345/530

(58) Field of Classification Search ................. 345/418, 345/467, 501, 530, 545, 551, 556, 564, 565, 345/581, 611

See application file for complete search history.

(56) References Cited

U.S. PATENT DOCUMENTS 4,814,756 A 3/1989 Chauvel ..................... 340/750
4,831,368 A 5/1989 Masimo et al.
5,224,210 A 6/1993 Pinedo et al.
5,561,780 A 10/1996 Glew et al.
5,613,103 A 3/1997 Nobutani et al. ............ 395/501
5,630,075 A 5/1997 Joshi et al.
5,670,984 A 9/1997 Robertson et al.
5,772,297 A 6/1998 Loo et al.
5,844,569 A 12/1998 Eisler et al.
5,877,779 A 3/1999 Goldberg et al. ............ 345/511
5,986,672 A 11/1999 Groezinger et al.
6,016,151 A 1/2000 Lin
6,072,507 A 6/2000 Balatsos et al.
6,188,385 B1 2/2001 Hill et al. .................... 345/136

(Continued)

OTHER PUBLICATIONS

"VRAM", http://www.webopedia.com/TERM/V/BRAM.html, Apr. 6, 2001.

(Continued)

*Primary Examiner*—Joni Hsu
(74) *Attorney, Agent, or Firm*—Woodcock Washburn LLP

(57) ABSTRACT

A method for dividing a display into zones at system initialization for tracking which zones have any pixels revised so that, when the time comes to update the display, only the zones requiring revision (that is, those zones in which any pixel has been revised) are copied from shadow memory to the frame buffer for display on the display device. The memory for tracking these zones can be allocated at initialization and held since it is relatively small. Consequently, a significant performance gain may be achieved by avoiding the shortcomings of the existing methods in the art notwithstanding the fact that some "clean" pixels in each zone having even a single changed pixel are also rewritten to the frame buffer.

31 Claims, 5 Drawing Sheets

U.S. PATENT DOCUMENTS

| | | | | |
|---|---|---|---|---|
| 6,252,612 | B1 | 6/2001 | Jeddeloh | |
| 6,278,434 | B1 | 8/2001 | Hill et al. | 345/127 |
| 6,339,426 | B1 | 1/2002 | Lui et al. | 345/467 |
| 6,342,890 | B1 | 1/2002 | Shetter | 345/467 |
| 6,356,270 | B2 | 3/2002 | Pentkovski et al. | |
| 6,356,278 | B1 | 3/2002 | Stamm et al. | 345/611 |
| 6,384,839 | B1 | 5/2002 | Paul | 345/613 |
| 6,392,655 | B1 | 5/2002 | Migdal et al. | 345/582 |
| 6,560,657 | B1 | 5/2003 | Gandhi et al. | |
| 6,633,685 | B1 | 10/2003 | Kusama et al. | 382/284 |
| 6,675,239 | B1 | 1/2004 | Van Hook et al. | 710/55 |
| 6,734,873 | B1 | 5/2004 | Herf et al. | |
| 6,958,757 | B2 | 10/2005 | Karlov | |
| 7,027,056 | B2 | 4/2006 | Koselj et al. | |
| 7,116,339 | B2 | 10/2006 | Wada | |
| 7,145,566 | B2 | 12/2006 | Karlov | |
| 7,298,782 | B2 | 11/2007 | Kuriakin et al. | |
| 7,307,634 | B2 | 12/2007 | Karlov | |
| 7,376,286 | B2 | 5/2008 | Locker et al. | |
| 2002/0196256 | A1 | 12/2002 | Hoppe et al. | 345/441 |
| 2004/0199798 | A1 | 10/2004 | Whelan et al. | 713/300 |
| 2005/0012751 | A1 | 1/2005 | Karlov | |
| 2005/0012753 | A1 | 1/2005 | Karlov | |

OTHER PUBLICATIONS

"Static Allocation", http://www.memorymanagement.org/glossarys/.html, Dec. 4, 2001.

United States Patent and Trademark Office: Non-Final Office Action dated Dec. 7, 2005, U.S. Appl. No. 10/622,749 filed Jul. 18, 2003.

United States Patent and Trademark Office: Final Office Action dated Apr. 20, 2006, U.S. Appl. No. 10/622,749 filed Jul. 18, 2003.

United States Patent and Trademark Office: Notice of Allowance dated Sep. 6, 2006, U.S. Appl. No. 10/622,749 filed Jul. 18, 2003.

United States Patent and Trademark Office: Non-Final Office Action dated Feb. 7, 2005, U.S. Appl. No. 10/622,597 filed Jul. 18, 2003.

United States Patent and Trademark Office: Final Office Action dated Aug. 11, 2005, U.S. Appl. No. 10/622,597 filed Jul. 18, 2003.

United States Patent and Trademark Office: Non-Final Office Action dated Jan. 11, 2006, U.S. Appl. No. 10/622,597 filed Jul. 18, 2003.

United States Patent and Trademark Office: Final Office Action dated May 3, 2006, U.S. Appl. No. 10/622,597 filed Jul. 18, 2003.

United States Patent and Trademark Office: Non-Final Office Action dated Nov. 22, 2006, U.S. Appl. No. 10/622,597 filed Jul. 18, 2003.

United States Patent and Trademark Office: Final Office Action dated Mar. 23, 2007, U.S. Appl. No. 10/622,597 filed Jul. 18, 2003.

United States Patent and Trademark Office: Non-Final Office Action dated Jun. 7, 2005, U.S. Appl. No. 10/778,724 filed Feb. 13, 2004.

United States Patent and Trademark Office: Non-Final Office Action dated Oct. 13, 2005, U.S. Appl. No. 10/778,724 filed Feb. 13, 2004.

United States Patent and Trademark Office: Non-Final Office Action dated Apr. 5, 2006, U.S. Appl. No. 10/778,724 filed Feb. 13, 2004.

United States Patent and Trademark Office: Final Office Action dated Aug. 24, 2006, U.S. Appl. No. 10/778,724 filed Feb. 13, 2004.

United States Patent and Trademark Office: Non-Final Office Action dated Nov. 29, 2006, U.S. Appl. No. 10/778,724 filed Feb. 13, 2004.

United States Patent and Trademark Office: Notice of Allowance dated Apr. 27, 2005, U.S. Appl. No. 10/623,220 filed Jul. 18, 2003.

United States Patent and Trademark Office: Non-Final Office Action dated Oct. 6, 2006, U.S. Appl. No. 11/189,609 filed Jul. 26, 2005.

United States Patent and Trademark Office: Non-Final Office Action dated Mar. 20, 2007, U.S. Appl. No. 11/189,609 filed Jul. 26, 2005.

United States Patent and Trademark Office: Notice of Allowance dated Aug. 23, 2007, U.S. Appl. No. 11/189,609 filed Jul. 26, 2005.

Johnson, S.P., "Direct3D Revealed: Microsoft's 3-D API provides device-independent access to acceleration hardware. Here's how it works," Core Technologies, http://byte.com/art9612/sec5/art4.thm, Dec. 1996, 5 pages.

SYSTEMS AND METHODS FOR UPDATING A FRAME BUFFER BASED ON ARBITRARY GRAPHICS CALLS

CROSS-REFERENCE TO RELATED APPLICATIONS

This application is a continuation application of and claims priority to U.S. application Ser. No. 10/622,749, filed Jul. 18, 2003, now U.S. Pat. No. 7,145,566, issued on Jan. 20, 2005, entitled "Systems and Methods for Updating a Frame Buffer Based on Arbitrary Graphic Calls," which is hereby incorporated by reference in its entirety. This application is related by subject matter to the inventions disclosed in the following commonly assigned applications: U.S. patent application Ser. No. 10/623,220, filed on Jul. 18, 2003, now U.S. Pat. No. 6,958,757, issued on Oct. 25, 2005, and entitled "SYSTEMS AND METHODS FOR EFFICIENTLY DISPLAYING GRAPHICS ON A DISPLAY DEVICE REGARDLESS OF PHYSICAL ORIENTATION"; and U.S. patent application Ser. No. 10/622,597, filed on Jul. 18, 2003, entitled "SYSTEMS AND METHODS FOR EFFICIENTLY UPDATING COMPLEX GRAPHICS IN A COMPUTER SYSTEM BY BY-PASSING THE GRAPHICAL PROCESSING UNIT ANT) RENDERING GRAPHICS IN MAIN MEMORY".

FIELD OF THE INVENTION

The present invention relates generally to the field of computer graphics, and more particularly to the efficient generation and updating of computer graphics in a computer frame buffer for display on a display device.

BACKGROUND OF THE INVENTION

There are many approaches to updating graphics on a display device. One classic method, although rarely used, is the brute force approach where changes to the display graphic are rendered by the processor to memory, and the entire updated graphic is then copied directly to the frame buffer for display. However, this method is extremely inefficient because every pixel of the display device is updated in the frame buffer whether the data for that pixel has changed or not, and the processing resources consumed by this approach are enormous.

A second method for updating graphics on a display device is for the processor to use a revision list to track in memory each pixel that is changed, and then copy only the updated pixels from memory to the frame buffer. This approach has the advantage of copying to the frame buffer data pertaining only to those pixels which have changed; however, this approach is also resource intensive in regard to the memory necessary for maintaining the revision list which, in the worst case scenario, may require a change to every pixel. This, along with other shortcomings, significantly slows video processing.

A third method for updating graphics on a display device involves a complex algorithmic approach that analyzes individual revisions and groups them geometrically into small but efficient "revision regions" comprising both "dirty" (changed) pixels as well as "clean" (unchanged) pixels. The regions are then merged together for an update to the frame buffer. However, for complex revisions, such as a curves and other shapes that can only be broken down into a very large number of small rectangular regions, conducting the merge (among other tasks) is very expensive computationally.

What is needed in the art is a resource-efficient approach to updating graphics on a display device. The present invention addresses these shortcomings.

SUMMARY OF THE INVENTION

The method for one embodiment of the present invention is to establish the zone grid at system initialization and, thereafter, track which zones have any pixels revised so that, when the time comes to update the display, only the zones requiring revision (that is, those zones in which any pixel has been revised) are copied from shadow memory to the frame buffer for display on the display device. The memory for tracking these zones can be allocated at initialization and held since it is relatively small. As a result, a significant performance gain may be achieved by avoiding the shortcomings of the existing methods in the art notwithstanding the fact that some "clean" pixels in each zone having even a single changed pixel are also rewritten to the frame buffer.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
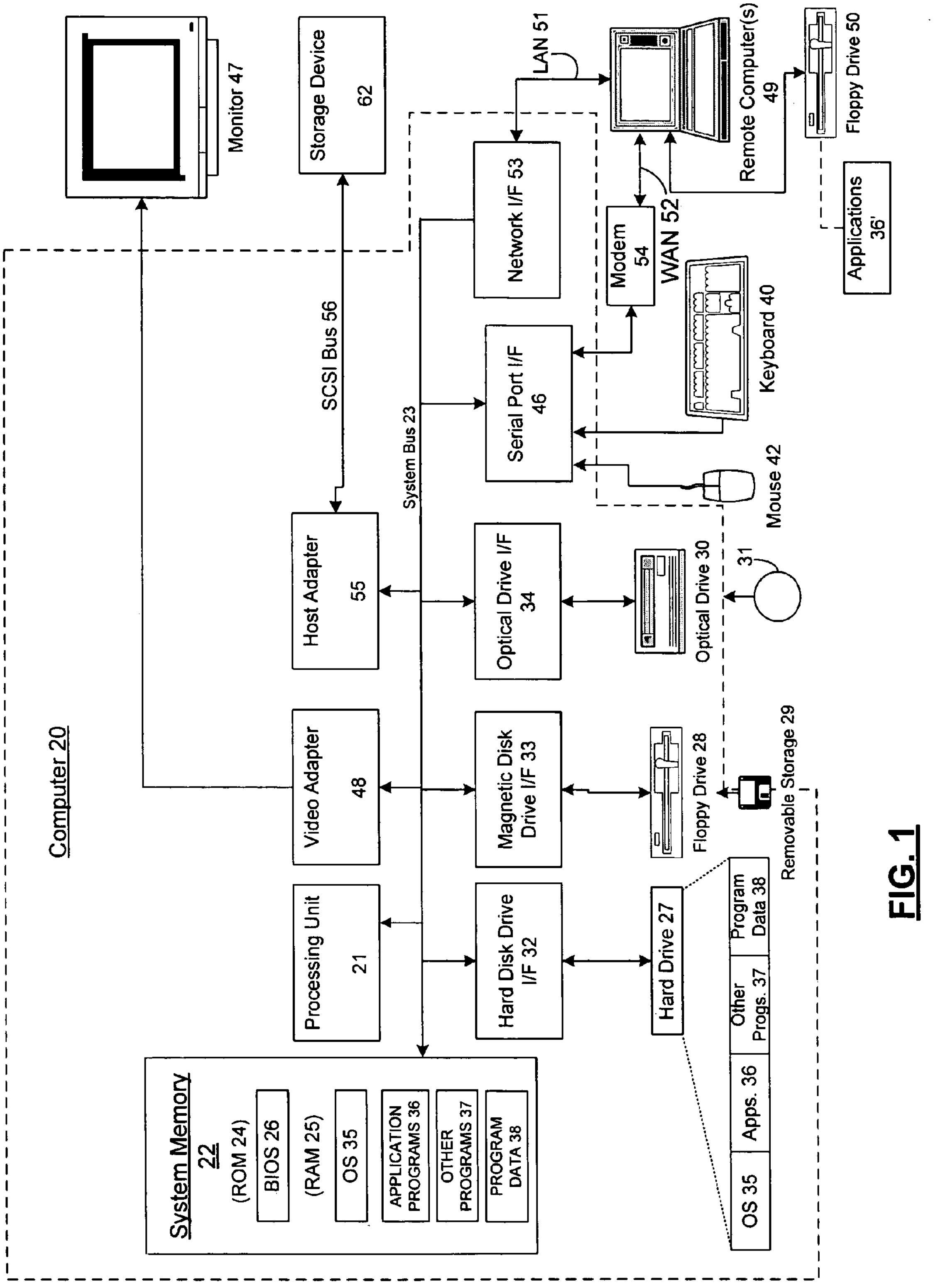
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices capable of storing and processing information and/or capable of using the stored information to control the behavior or execution of the device itself, regardless of whether such devices are electronic, mechanical, logical, or virtual in nature.

Graphics Processing

Figure 2A:
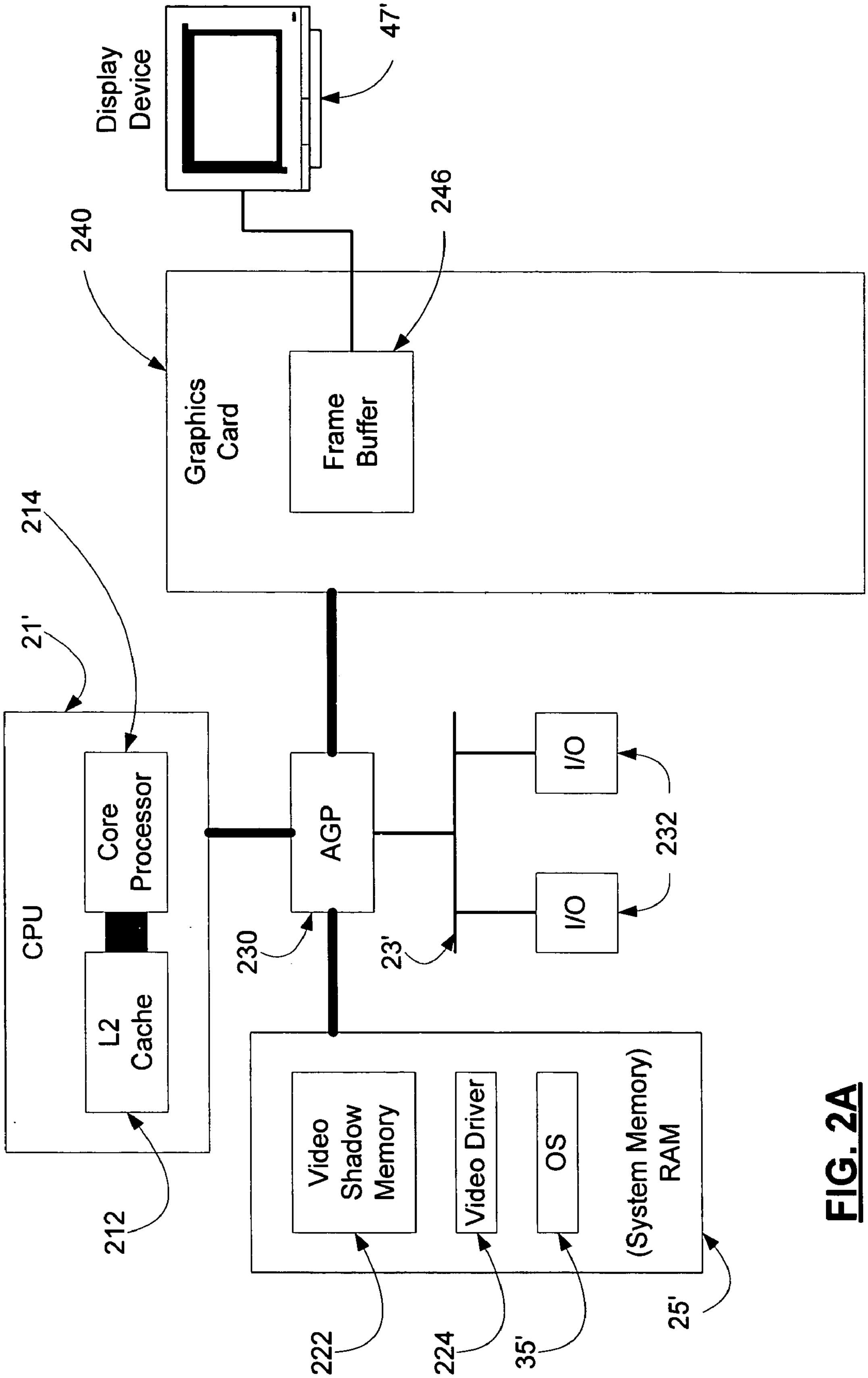
FIG. 2A is a block diagram illustrating a computer subsystem where graphics are rendered by the central processing unit (CPU) in main memory (RAM)
Figure 2B:
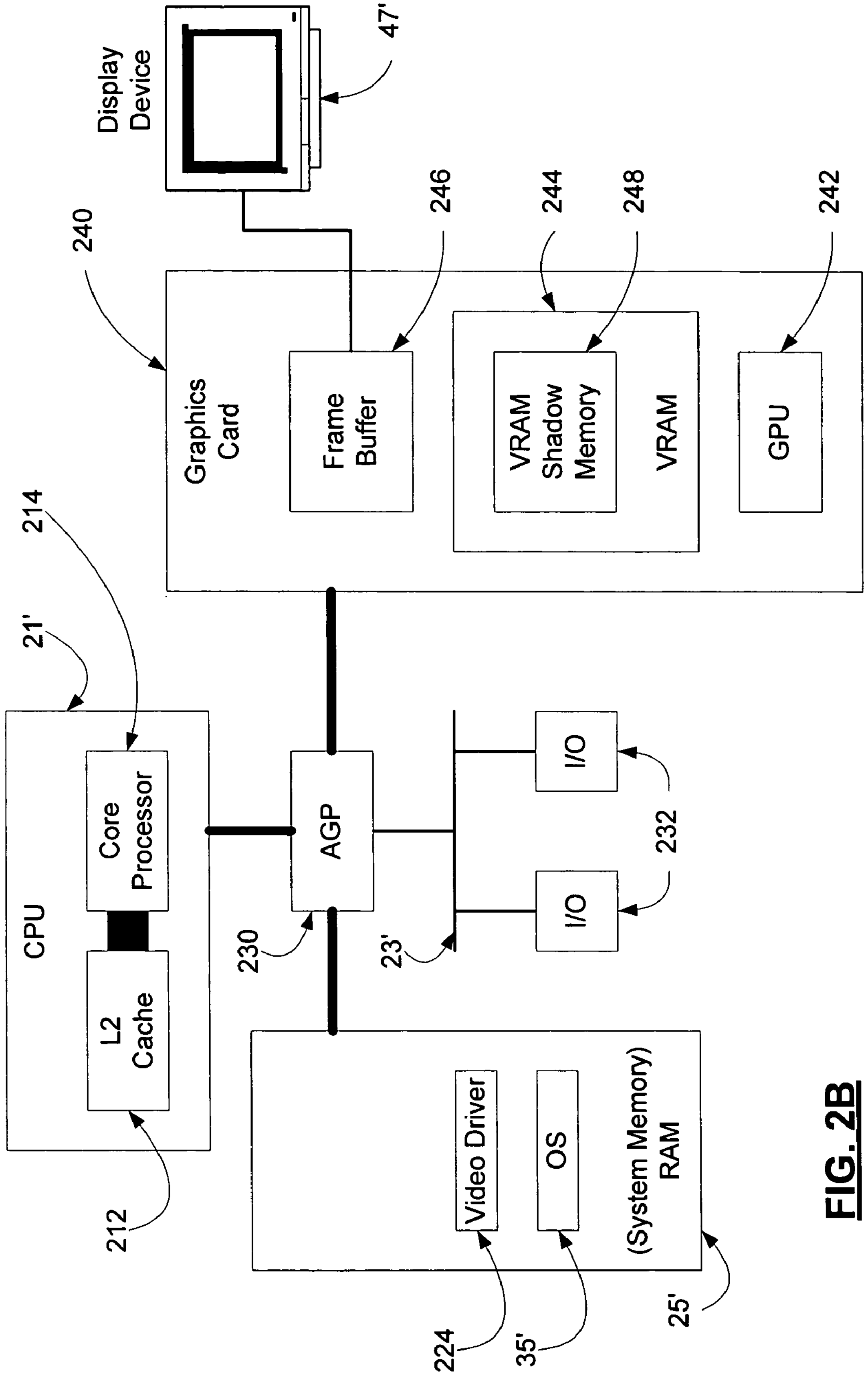
FIG. 2B is a block diagram illustrating a computer subsystem where graphics are rendered by a specialized graphical processing unit (GPU) in video memory (VRAM)
Figure 2C:
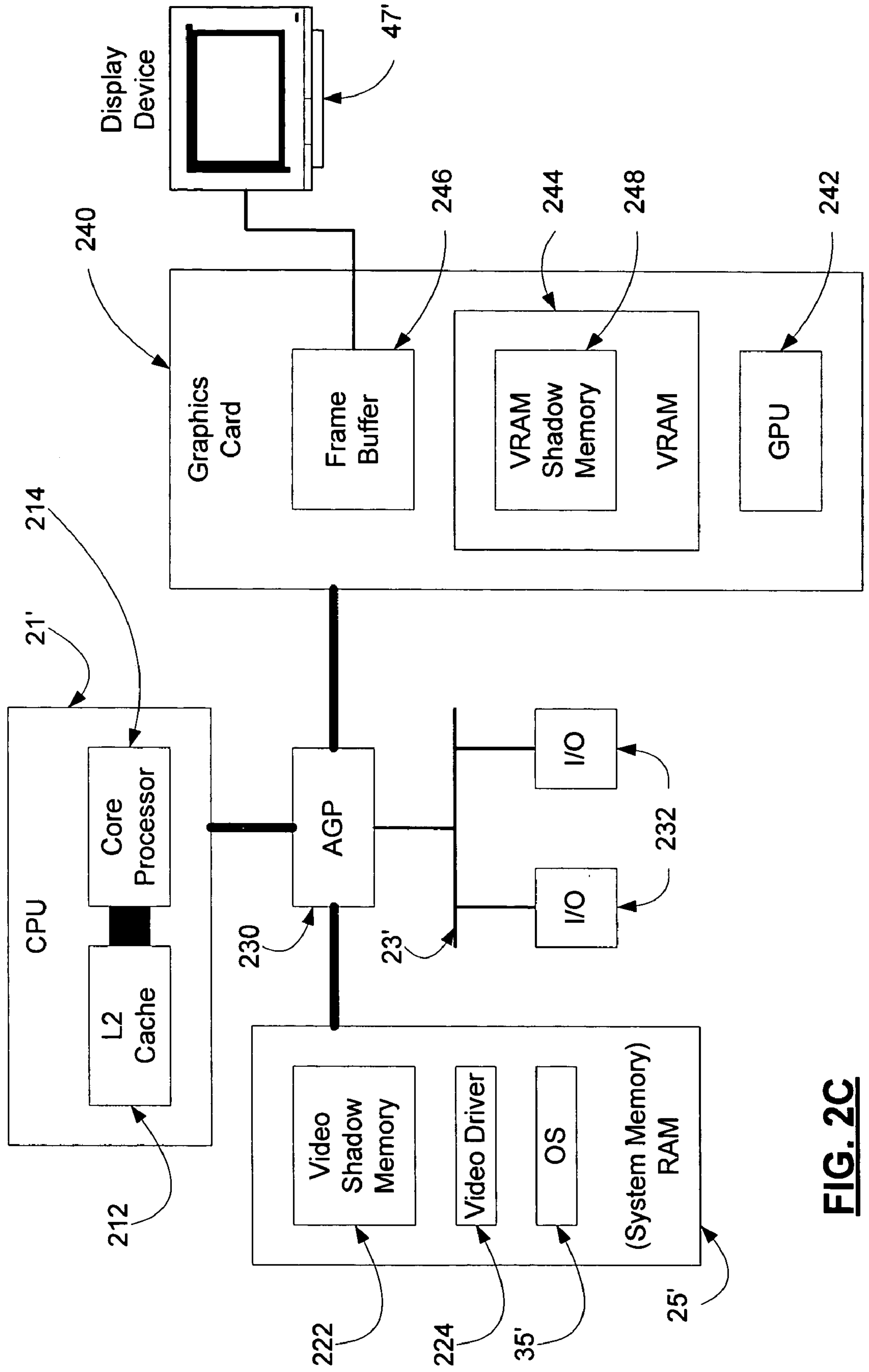
FIG. 2C is a block diagram illustrating the computer subsystems shown in both FIGS. 2A and 2B coexisting on the same computer system.

FIGS. 2A, 2B, and 2C are block diagrams illustrating the various elements of two general computer system that comprise typical graphics processing subsystems with which various embodiments of the present invention may be utilized. FIG. 2A illustrates a computer subsystem where graphics are rendered by the central processing unit (CPU) in main memory. FIG. 2B illustrates a computer subsystem where graphics are rendered by a specialized graphical processing unit (GPU) in video memory. FIG. 2C illustrates the computer subsystems shown in both FIGS. 2A and 2B coexisting on the same computer system.

In each system, a graphics processing subsystem comprises a central processing unit 21' that, in turn, comprises a core processor 214 having an on-chip L1 cache (not shown) and is further directly connected to an L2 cache 212. As well-known and appreciated by those of skill in the art, the CPU 21' accessing data and instructions in cache memory is much more efficient than having to access data and instructions in random access memory (RAM 25, referring to FIG. 1). The L1 cache is usually built onto the microprocessor chip itself, e.g., the Intel MMX microprocessor comes with a 32

KB L1 cache. The L2 cache 212, on the other hand, is usually on a separate chip (or possibly on an expansion card) but can still be accessed more quickly than RAM, and is usually larger than the L1 cache, e.g., one megabyte is a common size for a L2 cache.

For each system in these examples, and in contrast to the typical system illustrated in FIG. 1, the CPU 21' herein is then connected to an accelerated graphics port (AGP) 230. The AGP provides a point-to-point connection between the CPU 21', the system random access memory (RAM) 25', and graphics card 240, and further connects these three components to other input/output (I/O) devices 232—such as a hard disk drive 32, magnetic disk drive 34, network 53, and/or peripheral devices illustrated in FIG. 1—via a traditional system bus such as a PCI bus 23'. The presence of AGP also denotes that the computer system favors a system-to-video flow of data traffic—that is, that more traffic will flow from the CPU 21' and its system RAM 25' to the graphics card 240 than vice versa—because the AGP is typically designed to allow up to four times as much data to flow to the graphics card 240 than back from the graphics card 240.

Also common to FIGS. 2A, 2B, and 2C is the frame buffer 246 (on the graphics card 240) which is directly connected to the display device 47'. As well-known and appreciated by those of skill in the art, the frame buffer is typically dual-ported memory that allows a processor (the GPU 242 in FIG. 2B or the CPU 21' in FIG. 2A, as the case may be) to write a new (or revised) image to the frame buffer while the display device 47' is simultaneously reading from the frame buffer to refresh the current display content.

In the subsystem of FIG. 2A (and as further reflected in FIG. 2C), the system RAM 25' may comprise the operating system 35', a video driver 224, and video shadow memory (VSM) 222. The VSM, which is a mirror image of the frame buffer 246 on the graphics card 240, is the location in RAM 25' where the CPU 21' constructs graphic images and revisions to current graphics, and from where the CPU 21' copies graphic images to the frame buffer 246 of the graphics card 240 via the AGP 230. Using this subsystem, certain embodiments of the present invention may be directly executed by the CPU 21' and the RAM 25'.

In the subsystem of FIG. 2B (and as further reflected in FIG. 2C), the graphics card 240 may comprise a graphics processing unit (GPU) 242, video random access memory (VRAM) 244, and the frame buffer 246. The VRAM 244 further comprises a VRAM shadow memory (VRAMSM) 248. The GPU 242 and VRAMSM 248 essentially mirror the functionality of the CPU 21' and the VSM 222 of FIG. 2A for the specific purposes of rendering video. By offloading this functionality to the graphics card 240, the CPU 21' and VSM 222 are freed from these tasks. For this reason, certain embodiments of the present invention may be directly executed by the components of the graphics card 240 as herein described.

Again, FIG. 2C shows both of the subsystems of FIGS. 2A and 2B co-existing within a single computer system where the computer system itself ostensibly has the ability to utilize either subsystem to execute corresponding embodiments of the present invention.

As previously discussed earlier herein, there are many approaches to updating graphics on a display device. With the brute force approach, and in reference to FIG. 2C, changes to the display graphic are rendered by processor (by the CPU 21' or the GPU 242) to memory (VSM 222 or VRAMSM 248). The entire updated graphic is then copied from memory directly to the frame buffer for display. However, this method is extremely inefficient because every pixel of the display device is updated in the frame buffer whether the data for that pixel has changed or not. Moreover, at four bytes per pixel (for 32-bit true color) on a 1024×768 display device, each such update requires copying more than 3 MB of graphics data to the frame buffer, and thus the processing resources consumed by this approach are enormous.

A second known method for updating graphics on a display device is for the processor (the CPU 21' or the GPU 242) to use a revision list to track in memory (VSM 222 or VRAMSM 248) each pixel that is changed, and then copy only the updated pixels from memory to the frame buffer. This approach has the advantage of copying to the frame buffer data pertaining only to those pixels which have changed; however, this approach is also resource intensive in regard to the memory necessary for maintaining the revision list which, in the worst case scenario, may require a change to every pixel. At four bytes per pixel (for 32-bit true color) on a 1024×768 display device (having 1024 pixels per row and 768 pixels per column on the display device), this method requires nearly three megabytes of memory for the revision list. Since this amount of memory typically cannot be allocated and held by the system because of the negative impact such exclusive use of this memory would have on the processing speed of other, unrelated applications, this memory must be allocated (and, thereafter, released) real-time as the revisions are made. However, this amount of memory may not always be available for immediate use. Consequently, the graphic rendering software must have error-handling routines for out-of-memory conditions that might arise when required memory cannot be allocated. Altogether these shortcomings significantly slow video processing using this method.

A third method for updating graphics on a display device involves a complex algorithmic approach that analyzes individual revisions and groups them geometrically into small but efficient "revision regions" comprising both "dirty" pixels (pixels that have been changed) as well as "clean" pixels (that are unchanged). For efficiency, these regions are dynamically created and tracked in memory by various methods (e.g., by tracking starting point, number of horizontal pixels, and number of vertical pixels to rewrite) and are then merged together for an update to the frame buffer. However, for complex revisions, such as a curves and other shapes that can only be broken down into a very large number of small rectangular regions, the computational cost of determining the region size, shape, and location; dynamically allocating memory to track same (and releasing this memory when complete); and conducting the merge of revised regions is altogether very expensive computationally.

Figure 3:
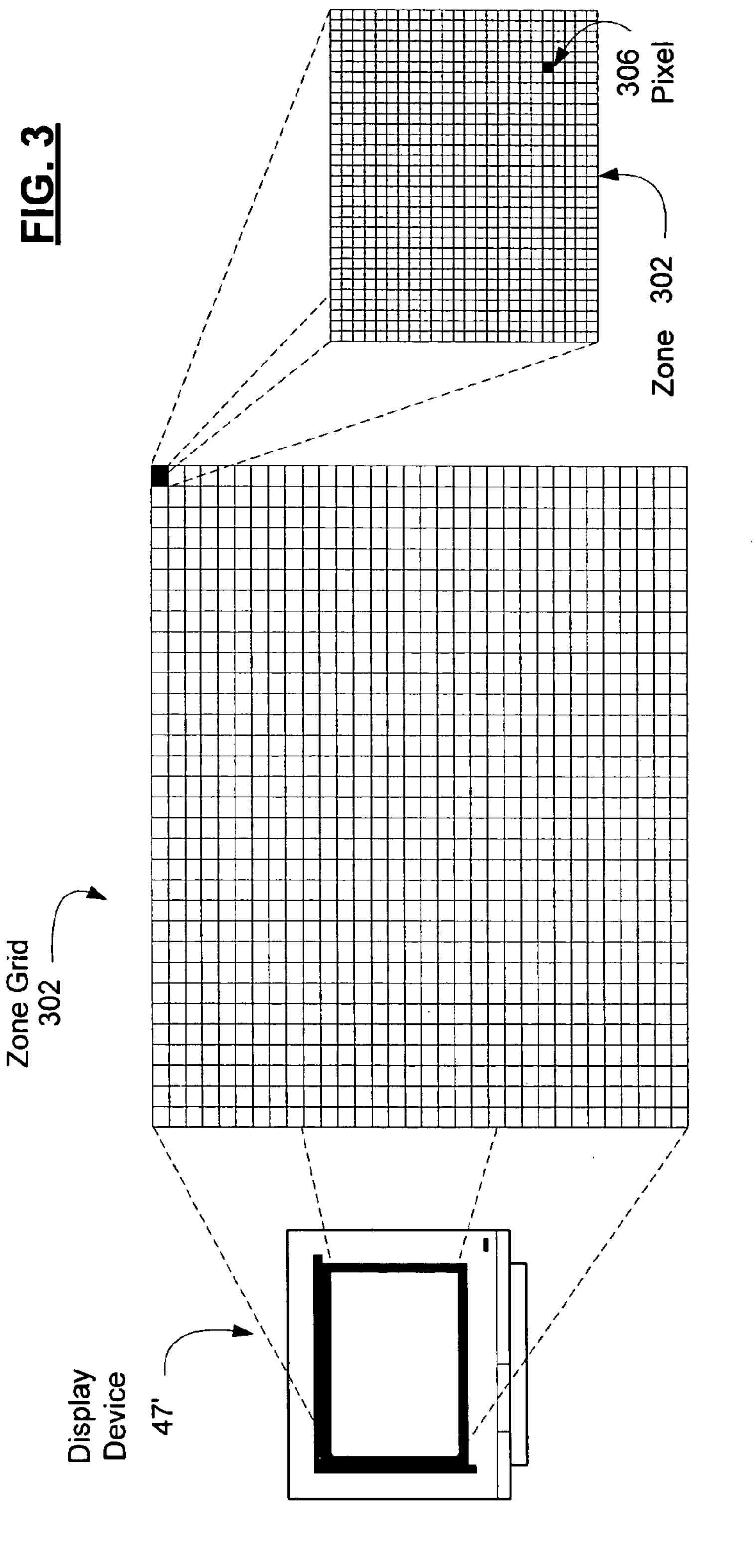
FIG. 3 is a block diagram illustrates the display area of a display device divided into a plurality of zones.

To address these shortcomings, in one embodiment of the present invention, the display area of the display device 47' (and the corresponding frame buffer 246*n* and/or shadow memories, VSM 222 and/or VRAMSM 248 respectively in FIG. 2C) is divided into a plurality of "zones" as illustrated in FIG. 3. As shown in this figure, the graphical display area of a 1024×768 pixel display device 47' may divided into 1024 zones forming a 32×32 "zone grid" 302. Each zone (e.g., zone 304) comprises 32×24 pixels (e.g., pixel 306)—that is, each zone has the same dimensions and number of pixels as the other zones. For this embodiment, the width and the height of each zone are each exactly $1/32^{nd}$ of the width and of the height of the display area of the display unit, and thus the number of zones vertically aligned on the display device is equal to the number of zones horizontally aligned on the display device (thereby forming a "square" zone grid). Moreover, in this particular embodiment, the zones are predefined at startup and are static (do not change).

In alternative embodiments of the present invention, the zones may be established at some time other than startup (not predetermined), and the zones may be dynamic based on algorithms employed to determine the most optimal zone size for any particular use (e.g., larger zones for text-based applications, smaller zones for applications that render detailed graphics objects) when the increased overhead necessary may be justified. Likewise, other alternative embodiments may not comprise a square zone grid but, instead, comprise a rectangular grid when the number of vertical zones is greater or less than the number of horizontal zones.

Figure 4:
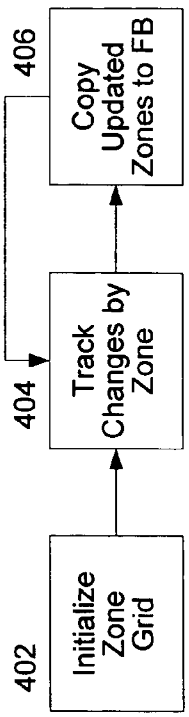
FIG. 4 is a flow chart illustrating the method for tracking revised zone and updating the display based on these revised zones.

The method for one embodiment of the present invention, as illustrated in FIG. 4 is to establish the zone grid at system initialization 402 and, thereafter, track which zones (e.g., zone 404) have any pixel revised so that, when the time comes to update the display, only the zones requiring revision are copied from shadow memory to the frame buffer 406. The method of this embodiment significantly reduces the overhead required to track the changes in the zone as only the starting point of each zone need be listed as the number of horizontal and vertical pixels for each zone is fixed, and the memory for tracking these zones can be allocated at initialization and held since it is relatively small. As a result, a significant performance gain may be achieved by avoiding the shortcomings of the existing methods in the art notwithstanding the fact that some "clean" pixels in each zone having even a single changed pixel are also rewritten to the frame buffer.

The foregoing method is particularly effective computer systems utilizing text-enhancement technologies (TETs) such as Microsoft's ClearType™. ClearType™ is a "sub-pixel anti-aliaser," a special type of TET software that dramatically improves the readability of text on LCDs (Liquid Crystal Displays), including without limitation laptop screens, Pocket PC screens, and flat panel monitors. ClearType™ enables the words on a display monitor to appear almost as sharp and clear as those printed on a piece of paper. This particular TET works by accessing the individual vertical color stripe elements (sub-pixels) in every pixel of an LCD screen. Prior to ClearType™, the smallest level of detail that a computer could display was a single pixel, but this TET displays features of text as small as a fraction of a pixel in width. This extra resolution increases the sharpness of the tiny details in text display, making it much easier to read over long durations. However, in operation this TET necessarily renders a very large number of graphic revisions to more clearly display the text, and these revisions are most effectively and efficiently rendered using the method described for the present embodiment.

CONCLUSION

The various system, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

What is claimed:

1. A computer-implemented method for updating a digital image on a computer display device, said method comprising using a computer for:

logically dividing the digital image into a plurality of zones, wherein the plurality of zones forms a zone grid;

storing each zone of the plurality of zones by a starting point of each zone;

storing the size of each zone;

tracking revised zones using the starting point and the size of each revised zone; and updating only the revised zones on the digital image, wherein the revised zones are part of the plurality of zones that forms the zone grid.

2. The method of claim 1 wherein each zone of said plurality of zones is predefined.

3. The method of claim 1 wherein the steps of logically dividing the image into a plurality of zones, and tracking revised zones using the starting point of each revised zone, are both performed by a graphical processing unit using a video random access memory.

4. The method of claim 1 wherein the steps of logically dividing the image into a plurality of zones, and tracking revised zones using the starting point of each revised zone, are both performed by a central processing unit using a system random access memory.

5. The method of claim 1 wherein the step of updating only the revised zones on the image is performed by a graphical processing unit writing the revised zones from a video random access memory to a frame buffer.

6. The method of claim 1 wherein the step of updating only the revised zones on the image is performed by a central processing unit writing the revised zones from a system random access memory directly to a frame buffer.

7. The method of claim 1 wherein the steps of logically dividing the image into a plurality of zones and tracking revised zones using the starting point of each revised zone are both performed by a graphical processing unit in a video random access memory; and wherein the step of updating only the revised zones on the image is performed by said graphical processing unit writing the revised zones from said video random access memory to a frame buffer.

8. The method of claim 1 wherein the steps of logically dividing the image into a plurality of zones and tracking revised zones using the starting point of each revised zone are both performed by a central processing unit in a system random access memory; and wherein the step of updating only the revised zones on the image is performed by said central processing unit writing the revised zones from said system random access memory directly to the frame buffer.

9. The method of claim 8 wherein said method is executed in conjunction with the use of a text-enhancement technology.

10. The method of claim 9 wherein said text-enhancement technology is a sub-pixel anti-aliaser.

11. The method of claim 1 wherein said method is executed in conjunction with the use of a text-enhancement technology.

12. The method of claim 11 wherein said text-enhancement technology comprises a sub-pixel anti-aliaser.

13. The method of claim 1 wherein said method is executed on a computer system that favors a system-to-video flow of data traffic.

14. A computer-implemented method for updating a digital image on a computer display device, said method comprising using a computer for:

logically dividing the digital image into a plurality of zones, wherein the plurality of zones forms a zone grid and wherein each zone of said plurality of zones has the same dimensions and number of pixels as the other zones;

storing each zone of the plurality of zones by a starting point of each zone;

storing the size of each zone;

tracking revised zones using the starting point and the size of each revised zone; and updating only the revised zones on the digital image, wherein the revised zones are part of the plurality of zones that forms the zone grid.

15. The method of claim 14 wherein each zone of said plurality of zones is predefined and has the same dimensions and number of pixels as the other zones.

16. The method of claim 14 wherein the number of zones vertically aligned on the image is equal to the number of zones horizontally aligned on the image.

17. A computer-implemented method for updating a digital image on a computer display device, said method comprising using a computer for:

logically dividing the digital image into a plurality of zones, wherein the plurality of zones forms a zone grid and wherein system random access memory used for logically dividing the image into a plurality of zones for tracking revised zones using the starting point of each revised zone is allocated at startup;

storing each zone of the plurality of zones by a starting point of each zone;

storing the size of each zone;

tracking revised zones using the starting point and the size of each revised zone; and updating only the revised zones on the digital image, wherein the revised zones are part of the plurality of zones that forms the zone grid.

18. A computer-readable medium having computer-readable instructions for updating an image on a computer display device, said computer-readable instructions comprising:

instructions for logically dividing the image into a plurality of zones, wherein the plurality of zones forms a zone grid;

instructions for storing each zone of the plurality of zones by a starting point of each zone;

instructions for storing the size of each zone;

instructions for tracking revised zones using the starting point and the size of each revised zone; and instructions for updating only the revised zones on the image.

19. The computer-readable medium of claim 18 further comprising instructions for predefining a plurality of zones.

20. The computer-readable medium of claim 19 further comprising instructions for the graphical processing unit to logically divide the image into a plurality of zones in video random access memory and thereafter track those zones in said plurality of zones that are revised using the starting point of each revised zone.

21. The computer-readable medium of claim 18 further comprising instructions for the central processing unit to logically divide the image into a plurality of zones in RAM and thereafter track those zones in said plurality of zones that are revised using the starting point of each revised zone.

22. The computer-readable medium of claim 18 further comprising instructions for a graphical processing unit to update only a plurality of revised zones on the image by writing the plurality of revised zones from a video random access memory to a frame buffer.

23. The computer-readable medium of claim 18 further comprising instructions for a central processing unit to update only a plurality of revised zones on the image by writing the plurality of revised zones from a RAM to a frame buffer.

24. The computer-readable medium of claim 23 wherein said method is executed in conjunction with the use of a text-enhancement technology.

25. The computer-readable medium of claim 18 wherein said method is executed in conjunction with the use of a text-enhancement technology.

26. The computer-readable medium of claim 18 wherein said method is executed on a computer system that favors a system-to-video flow of data traffic.

27. The computer-readable medium of claim 18 wherein system random access memory used for logically dividing the image into a plurality of zones for tracking revised zones using the starting point of each revised zone is allocated at startup.

28. A computer-readable medium having computer-readable instructions for updating an image on a computer display device, said computer-readable instructions comprising:

instructions for logically dividing the image into a plurality of zones, wherein the plurality of zones forms a zone grid;

instructions for dividing the image into a plurality of zones each having the same dimensions and number of pixels;

instructions for storing each zone of the plurality of zones by a starting point of each zone;

instructions for storing the size of each zone;

instructions for tracking revised zones using the starting point and the size of each revised zone; and instructions for updating only the revised zones on the image, wherein the revised zones are part of the plurality of zones that forms the zone grid.

29. The computer-readable medium of claim 28 further comprising instructions for predefining a plurality of zones and for dividing the image, wherein all zones in said plurality of zones each have the same dimensions and number of pixels.

30. The computer-readable medium of claim 28 further comprising instructions for dividing the image into a plurality of zones wherein the number of zones in said plurality of zones vertically aligned on the image is equal to the number of zones in said plurality of zones horizontally aligned on the image.

31. A system for updating an image on a computer display device, said system comprising:

means for logically dividing the image into a plurality of zones, wherein the plurality of zones forms a zone grid;

means for storing each zone of the plurality of zones by a starting point of each zone;

means for storing the size of each zone;

means for tracking revised zones using the starting point and the size of each revised zone; and means for updating only the revised zones on the image, wherein the revised zones are part of the plurality of zones that forms the zone grid.

* * * * *